(12) United States Patent
An et al.

(10) Patent No.: US 9,664,903 B2
(45) Date of Patent: May 30, 2017

(54) OPTICAL DEVICE FOR AUGMENTED REALITY

(71) Applicant: SAMSUNG ELECTRONICS CO., LTD., Suwon-si (KR)

(72) Inventors: Jungkwuen An, Cheonan-si (KR); Aleksander Victorovich Morozov, Moscow Region (RU); Andrey Nikolaevich Putilin, Moscow (RU); Elena Gennadievna Malinovskaya, Moscow (RU); Vladislav Vladimirovich Druzhin, Moscow (RU)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 83 days.

(21) Appl. No.: 14/844,133

(22) Filed: Sep. 3, 2015

(65) Prior Publication Data

US 2016/0077335 A1 Mar. 17, 2016

(30) Foreign Application Priority Data

Sep. 16, 2014 (RU) .................................. 2014137446
Jan. 19, 2015 (KR) ........................ 10-2015-0008766

(51) Int. Cl.
*G02B 27/01* (2006.01)
*G02B 27/28* (2006.01)
(Continued)

(52) U.S. Cl.
CPC ....... *G02B 27/0101* (2013.01); *G02B 5/3083* (2013.01); *G02B 6/0035* (2013.01);
(Continued)

(58) Field of Classification Search
CPC ............... G02B 6/0056; G02B 27/01–27/0189
See application file for complete search history.

(56) References Cited

U.S. PATENT DOCUMENTS 5,526,184 A * 6/1996 Tokuhashi ......... G02B 27/0172
359/489.07
5,596,451 A * 1/1997 Handschy .......... G02B 27/0172
359/633

(Continued)

FOREIGN PATENT DOCUMENTS

KR 1020120130418 A 12/2012

OTHER PUBLICATIONS

Rui Zhang, Hong Hua; "Design of a polarized head-mounted projection display using FLCOS microdisplays", Proc. of SPIE, vol. 6489, (2007), Total 10 pages, 64890B1-10.

Primary Examiner — Bumsuk Won
Assistant Examiner — Jeffrey Madonna
(74) Attorney, Agent, or Firm — Sughrue Mion, PLLC

(57) ABSTRACT

An optical device includes a light input part and a light output part. The light input part includes a micro display; a first and a second polarizing beam splitters configured to reflect or transmit incident light including an image displayed on the micro display; and a first quarter wavelength plate configured to receive light transmitted by the first polarizing beam splitter or the second polarizing beam splitter and change a polarized state of the received light. The light output part includes a third and a fourth polarizing beam splitters configured to transmit or reflect light including the image received from the light input part; a second quarter wavelength plate configured to receive the light transmitted by the third polarizing beam splitter or the fourth polarizing beam splitter and change the polarized state of the received light, and a light condenser configured to condense the polarized light.

14 Claims, 5 Drawing Sheets

(51) Int. Cl.
 *G02B 5/30* (2006.01)
 *F21V 8/00* (2006.01)
(52) U.S. Cl.
 CPC ......... *G02B 6/0056* (2013.01); *G02B 27/285* (2013.01); *G02B 2027/0123* (2013.01); *Y02B 20/36* (2013.01)

(56) References Cited

U.S. PATENT DOCUMENTS

| | | | |
|---|---|---|---|
| 5,886,822 A * | 3/1999 | Spitzer | G02B 27/0172 359/630 |
| 6,204,974 B1 * | 3/2001 | Spitzer | G02C 7/086 359/630 |
| 8,259,239 B2 | 9/2012 | Hua | |
| 8,786,686 B1 * | 7/2014 | Amirparviz | H04N 13/044 345/8 |
| 2007/0047091 A1 * | 3/2007 | Spitzer | G02B 27/0172 359/630 |
| 2008/0278812 A1 * | 11/2008 | Amitai | G02B 6/00 359/485.05 |
| 2009/0015929 A1 * | 1/2009 | DeJong | G02B 27/0081 359/633 |
| 2009/0122414 A1 * | 5/2009 | Amitai | G02B 27/0172 359/633 |
| 2010/0067100 A1 * | 3/2010 | Shiota | H01S 3/0675 359/341.1 |
| 2010/0202048 A1 * | 8/2010 | Amitai | G02B 27/0101 359/485.02 |
| 2011/0019250 A1 * | 1/2011 | Aiki | G02B 5/32 359/15 |
| 2013/0016292 A1 * | 1/2013 | Miao | G02B 27/283 349/11 |
| 2013/0250415 A1 | 9/2013 | Gupta | |

* cited by examiner

OPTICAL DEVICE FOR AUGMENTED REALITY

CROSS-REFERENCE TO RELATED APPLICATION

This application claims priority from Korean Patent Application No. 10-2015-0008766, filed on Jan. 19, 2015, in the Korean Intellectual Property Office and Russian Patent Application No. 2014137446, filed on Sep. 16, 2014, in the Federal Service for Intellectual Property (Rospatent), the disclosures of which are incorporated herein by reference in their entireties.

BACKGROUND

1. Field

Apparatuses consistent with exemplary embodiments relate to an optical device for providing augmented reality.

2. Description of the Related Art

Augmented reality refers to a technology for augmenting a real image by adding virtual information or graphics. The virtual information may be, for example, a text or a graphic image displayed on a micro display, and the real image may include information about a real object observed within a field of view of a device.

Augmented reality may be provided by using a method of outputting an image photographed by a camera or the like and adding information about an object included in the image, such as a person, a thing, or the like, to the photographed image.

In another method, augmented reality may be obtained via a head-mounted display apparatus or a heads-up display apparatus, such as, Google Glass™, which does not directly output a photographed image, but outputs only information about an object included in the photographed image.

When the methods using the head-mounted display apparatus or a heads-up display apparatus are used, the display apparatus needs to include a beam splitter, a lens, a display, and the like.

SUMMARY

Aspects of the exemplary embodiments provide an optical device for providing augmented reality, the optical device having a reduced thickness.

Additional aspects will be set forth in part in the description which follows and, in part, will be apparent from the description, or may be learned by practice of the presented exemplary embodiments.

According to an aspect of an exemplary embodiment, provided is an optical device for augmented reality, the optical device including: a light input part; and a light output part, wherein the light input part includes: a micro display; a first polarizing beam splitter and a second polarizing beam splitter configured to reflect or transmit incident light comprising an image displayed on the micro display; and a first quarter wavelength plate configured to receive light transmitted by the first polarizing beam splitter or the second polarizing beam splitter and change a polarized state of the received light, and wherein the light output part includes: a third polarizing beam splitter and a fourth polarizing beam splitter configured to transmit or reflect light comprising the image received from the light input part; a second quarter wavelength plate configured to receive the light transmitted by the third polarizing beam splitter or the fourth polarizing beam splitter and change the polarized state of the received light, and a light condenser configured to condense the polarized light.

The light input part may further include a light source, and a condenser lens configured to parallelize the incident light.

The first polarizing beam splitter and the second polarizing beam splitter may be further configured to split the incident light into p-polarized light and s-polarized light, the micro display may be configured to receive the p-polarized light or the s-polarized light that passes through the first quarter wavelength plate and reflect the received p-polarized light or the s-polarized light to the first quarter wavelength plate, the first quarter wavelength plate may be further configured to transmit the p-polarized light or the s-polarized light that is reflected by the micro display, and the first polarizing beam splitter and the second polarizing beam splitter may be further configured to reflect the p-polarized light or the s-polarized light transmitted from the first quarter wavelength plate to be transmitted to the light output part.

The third polarizing beam splitter and the fourth polarizing beam splitter may be further configured to reflect the light comprising the image received from the light input part, the second quarter wavelength plate may be further configured to transmit the light reflected by the third polarizing beam splitter or the fourth polarizing beam splitter; the light condenser may be further configured to reflect the light transmitted from the second quarter wavelength plate; and the second quarter wavelength plate may be further configured to transmit the light reflected by the light condenser to be transmitted to an outside.

The optical device may further include a light guide plate including an optically transparent material and configured to provide a path of the light, the light guide plate being provided a form of a parallel plate.

The optical device may further include a light guide plate including an optically transparent material and configured to provide a path of the light, the light guide plate being provided in a form of a curved plate.

At least one of the first polarizing beam splitter and the second polarizing beam splitter may include at least one of a reflection member, a prism, and a Fresnel prism, having a polarization coating thereon.

The image may include at least one of a two dimensional (2D) image and a holographic image.

The micro display may include at least one of a reflective light modulator, a light-emitting diode (LED), and an organic light-emitting diode (OLED).

The light condenser may be positioned on a surface of the light output part, the surface being closest to the micro display among surfaces of the light output part.

The light condenser may be positioned on a surface of the light output part, the surface being farthest away from the micro display among surfaces of the light output part.

The light source and the condenser lens may be positioned adjacent to a surface of the light input part, the surface being farthest away from the micro display among surfaces of the light output part.

The light source and the condenser lens may be positioned adjacent to a surface of the light input part, the surface being vertical to the micro display.

The light output part may further include a compensation element configured to receive and magnify externally provided light, the externally provided light including information about an external object.

BRIEF DESCRIPTION OF THE DRAWINGS

The above and/or other aspects will become more apparent by describing certain exemplary embodiments with reference to the accompanying drawings in which.

DETAILED DESCRIPTION

Figure 1:
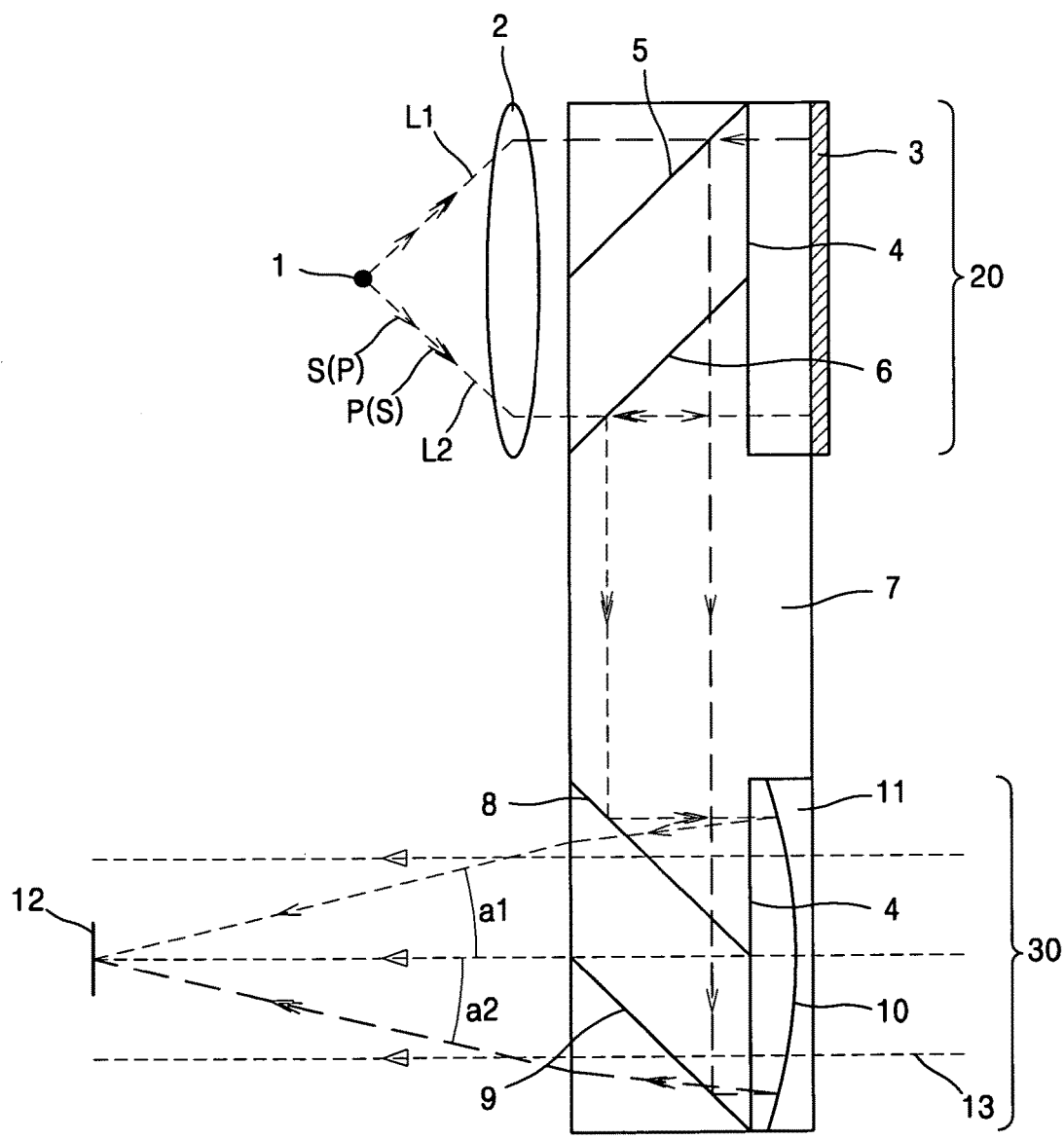
FIG. 1 is a schematic cross-sectional view of an optical device for augmented reality according to an exemplary embodiment.

The inventive concept will now be described more fully with reference to the accompanying drawings, in which exemplary embodiments of the inventive concept are shown. The inventive concept may, however, be embodied in many different forms and should not be construed as being limited to the exemplary embodiments set forth herein. In the description, certain detailed explanations of the related art are omitted when it is deemed that they may unnecessarily obscure the essence of the inventive concept. Like reference numerals in the drawings denote like elements.

The expression "A is connected to B" as used herein means that A is "electrically connected" to B via another device between A and B as well as that "A is directly connected to B". Throughout the specification, when a portion "includes" an element, another element may be further included, rather than excluding the existence of the other element, unless otherwise described.

FIG. 1 is a schematic cross-sectional view of an optical device for augmented reality according to an exemplary embodiment. Referring to FIG. 1, the optical device for augmented reality may include a light input means (or a light input part) 20 and a light output means (or a light output part) 30.

The light input means 20 may include a light source unit (or a light source) 1, a condenser lens 2, a micro display 3, a quarter wavelength plate 4, a light guide plate 7, a first polarizing beam splitter 5 and a second polarizing beam splitter 6.

The light output means 30 may include the quarter wavelength plate 4, the light guide plate 7, the third polarizing beam splitter 8, the fourth polarizing beam splitter 9, a light-condensing unit (or a light condenser) 10 and a compensation element 11.

The light source unit 1 may include a light-emitting diode (LED), an organic light-emitting diode (OLED), a laser diode, a solid laser or an optical fiber. However, the light source unit 1 is not limited thereto and may include any light source suitable for a backlight device.

The condenser lens 2 may parallelize light that is incident onto the light guide plate 7.

The light guide plate 7 may include a highly-transparent plastic, an optical glass or a quartz glass, but is not limited thereto. The light guide plate 7 may be provided in a form of a parallel plate or a curved plate, but is not limited thereto.

The first polarizing beam splitter 5 of the light input means 20 and the fourth polarizing beam splitter 9 of the light output means 30 may transmit p-polarized light (or s-polarized light) of incident light and reflect s-polarized light (or p-polarized light) thereof. The second polarizing beam splitter 6 of the light input means 20 and the third polarizing beam splitter 8 of the light output means 30 may transmit s-polarized light (or p-polarized light) of incident light and reflect p-polarized light (or s-polarized light) thereof. The p-polarized light is light vibrates in a direction parallel to a plane of incidence, and the s-polarized light vibrates in a direction vertical to the plane of incidence.

The micro display 3 may include a reflective light modulator. Also, the micro display 3 may include a light-emitting diode (LED) or an organic light-emitting diode (OLED) instead of a light modulator.

The light-condensing unit 10 may include an optically transparent material. The light-condensing unit 10 may reflect and/or condense incident light and may also transmit light incident from the outside.

The compensation element 11 may magnify light 13 including information about an external object, which is condensed by the light-condensing unit 10, so that the light 13 may reach the eyes of an observer 12 while having information about an original size and/or shape of the external object.

The light source unit 1 and the condenser lens 2 of the light input means 20 may be placed in front of the light guide plate 7 to face the micro display 3. The first polarizing beam splitter 5 and the second polarizing beam splitter 6 may be placed between the light source unit 1 and the micro display 3 and parallel to each other in the light guide plate 7.

The third polarizing beam splitter 8 and the fourth polarizing beam splitter 9 of the light output means 30 may be placed to be parallel to each other in the light guide plate 7. The third polarizing beam splitter 8 and the fourth polarizing beam splitter 9 may be inclined in a direction that is symmetrical to a direction in which the first polarizing beam splitter 5 and the second polarizing beam splitter 6 are inclined. In addition, the light-condensing unit 10 and the compensation element 11 may be placed on a surface of the light guide plate 7, on which the micro display 3 is placed.

Light beam emitted from the light source unit 1 may be incident onto the condenser lens 2 and the condenser lens 2 may parallelize the incident light beam. The light beam is incident onto the light guide plate 7. For the convenience of explanation, hereinafter, light incident onto the first polarizing beam splitter 5 is referred to as a first light beam L1, and light incident onto the second polarizing beam splitter 6 is referred to as a second light beam L2. The first light beam L1 may pass through the first polarizing beam splitter 5 and then become p-polarized light (or s-polarized light), whereas the second light beam L2 may pass through the second polarizing beam splitter 6 and then become s-polarized light (or p-polarized light).

The first light beam L1 and the second light beam L2 may pass through the quarter wavelength plate 4 to be delivered to the micro display 3. Based on the first and second light beams L1 and L2, an image for augmented reality may be generated and displayed on the micro display 3. For example, at least one of a two dimensional (2D) image and a holographic image may be displayed on the micro display 3.

The micro display 3 may include a reflective light modulator, and in this case, light beam incident onto the micro display 3 may be reflected in an incident direction. Also, the micro display 3 may include a light-emitting diode (LED) or an organic light-emitting diode (OLED), and in this case, the light source unit 1 and the condenser lens 2 may be omitted.

The first and second light beams L1 and L2 having information about the image may be incident onto the micro display 3 and then reflected to pass through the quarter wavelength plate 4 again. Thus, the polarized light passes through the quarter wavelength plate 4 twice, and a polarization direction may change to be vertical to the original polarization direction. In other words, p-polarized light may become s-polarized light, whereas s-polarized light may become p-polarized light when passing through the quarter wavelength plate 4 again. In this regard, when the first light beam L1 is incident onto the first polarizing beam splitter 5 after being incident onto the micro display 3, the first light beam L1 is s-polarized light (or p-polarized light) and thus the first light beam L1 may be reflected by the first polarizing beam splitter 5 to be delivered to the light output means 30 through the light guide plate 7. When the second light beam L2 is incident onto the second polarizing beam splitter 6 after being incident onto the micro display 3, the second light beam L2 is p-polarized light (or s-polarized light) and thus the second light beam L2 may be reflected by the second polarizing beam splitter 6 to reach the light output means 30 through the light guide plate 7.

The first light beam L1 and the second light beam L2, having information about the image, may be reflected by the third and fourth polarizing beam splitters 8 and 9 of the light output means 30 toward the light-condensing unit 10 and then pass through the quarter wavelength plate 4. The light beams L1 and L2 may be reflected by the light-condensing unit 10 and pass through the quarter wavelength plate 4 again, so that the direction of polarization may be changed to be vertical to the original direction. In this regard, the second light beam L2 that is incident onto the third polarizing beam splitter 8 after being reflected by the light-condensing unit 10 is s-polarized light (or p-polarized light) and thus may pass through the third polarizing beam splitter 8. Then, the second light beam L2 may be delivered to eyes of the observer 12 at a viewing angle a1. Also, the first light beam L1 that is incident onto the fourth polarizing beam splitter 9 after being reflected by the light-condensing unit 10 is p-polarized light (or s-polarized light) and thus may pass through the fourth polarizing beam splitter 9. Then, the second light beam L1 may be delivered to the eyes of the observer 12 at a viewing angle a2.

To magnify the light 13 including information about an external object which is condensed by the light-condensing unit 10, the compensation element 11 may be used. The compensation element 11 may magnify the light 13 including information about the external object condensed by the light-condensing unit 10 so that the observer 12 may view an image of the external object in the original size and shape. By using the compensation element 11, the optical device according to an exemplary embodiment may have no optical influence on the size and shape of the external object.

Also, the first light beam L1 incident onto the first polarizing beam splitter 5 is delivered to the eyes of the observer 12 through the fourth polarizing beam splitter 9, and the second light beam L2 incident onto the second polarizing beam splitter 6 is delivered to the eyes of the observer 12 through the third polarizing beam splitter 8. In this regard, an image that the observer 12 may see may appear in a reversed left and right direction compared to the image displayed on the micro display 3. Therefore, in order for the observer 12 to view an image in a normal direction, i.e., unreversed left and right direction, an image for augmented reality may be formed in the reversed left and right direction on the micro display 3.

An optical device for augmented reality according to an exemplary embodiment may use at least two polarizing beam splitters for each of the light input means 20 and the light output means 30 so that a width of the polarizing beam splitter may be reduced to reduce the thickness of the entire optical device.

Figure 2A:
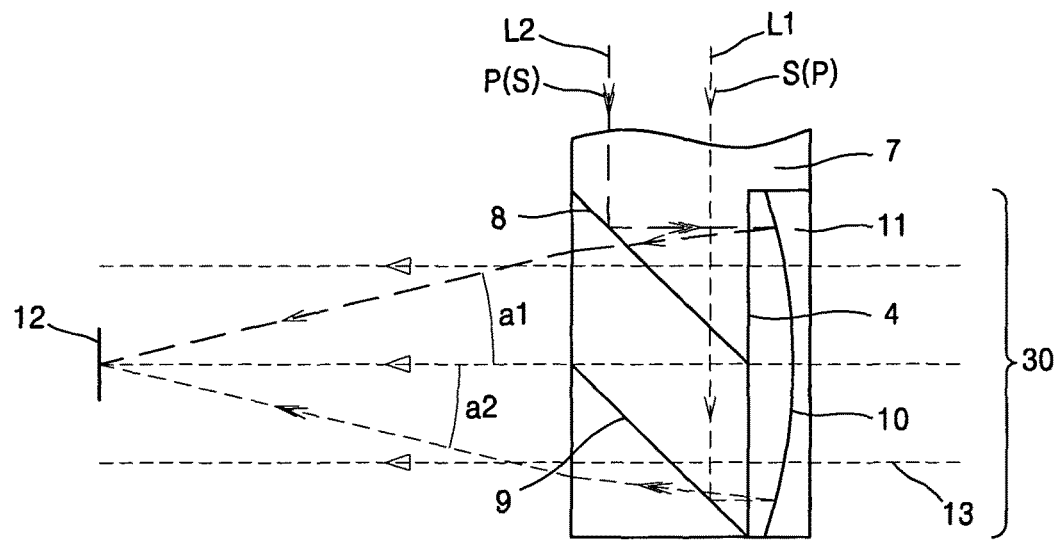
FIG. 2A is a sectional view of a light output means in FIG. 1.

FIG. 2A is a sectional view of the light output means 30 in FIG. 1. Referring to FIGS. 1 and 2A, in the light output means 30, the light-condensing unit 10 and the compensation element 11 may be placed on a surface of the light guide plate 7 in a direction opposite to the eyes of the observer 12.

Figure 2B:
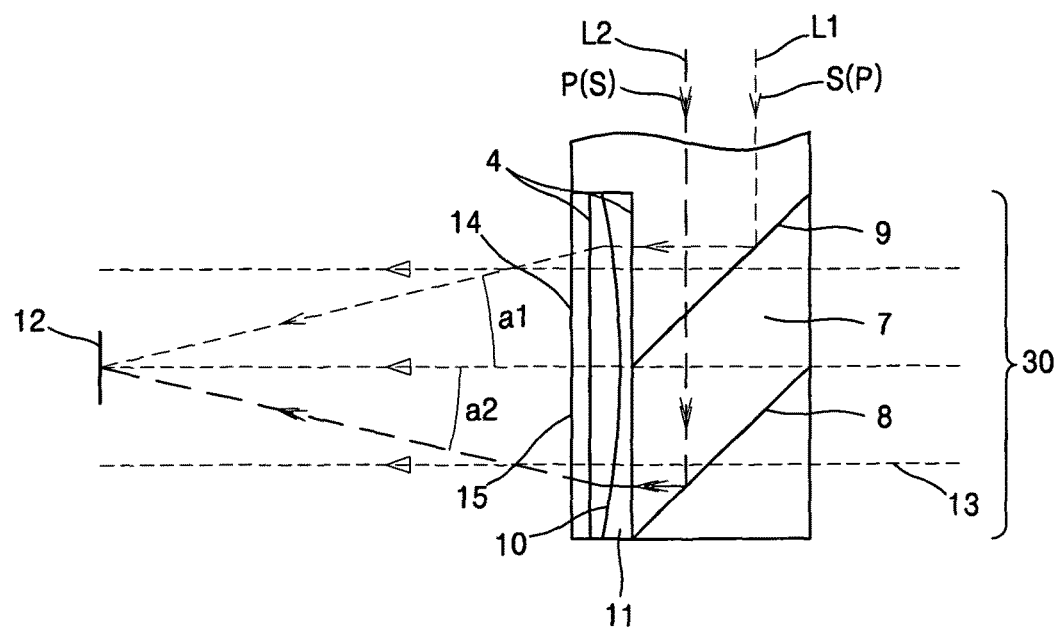
FIG. 2B is a sectional view of a light output means of an optical device for augmented reality according to another exemplary embodiment.

FIG. 2B is a sectional view of the light output means 30 of an optical device for augmented reality according to another exemplary embodiment.

In FIG. 2B, the light-condensing unit 10 and the compensation element 11 are placed on a surface of the light guide plate 7 in a direction toward the eyes of the observer 12, which is different from the exemplary embodiment of FIG. 2A. Referring to FIG. 2B, the light output means 30 may include two quarter wavelength plates 4, the third and fourth polarizing beam splitters 8 and 9, the light-condensing unit 10, and a first and a second polarizing optical element 14 and 15.

The first polarizing optical element 14 reflects only p-polarized light (or s-polarized light) and transmits s-polarized light (or p-polarized light). The second polarizing optical element 15 reflects only s-polarized light (or p-polarized light) and transmits p-polarized light (or s-polarized light).

The first light beam L1 that is delivered from the light input means 20 is s-polarized light (or p-polarized light) and thus, the first light beam L1 may be reflected by the fourth polarizing beam splitter 9. The reflected light beam L1 may sequentially pass through the quarter wavelength plate 4, the light-condensing unit 10 and again the quarter wavelength plate 4. Because the light passes through the quarter wavelength plate 4 twice, the first light beam L1 may become p-polarized light (or s-polarized light). Accordingly, the first light beam L1 may be reflected by the first polarizing optical element 14 and then pass through the quarter wavelength plate 4, and be further reflected by the light-condensing unit 10. The first light beam L1 that is reflected by the light-condensing unit 10 passes through the quarter wavelength plate 4 again. Because the first light beam L1 passes through the quarter wavelength plate 4 twice again, the first light beam L1 may become s-polarized light (or p-polarized light). Accordingly, the first light beam L1 may pass through the first polarizing optical element 14 to be delivered to the eyes of the observer 12.

Also, the second light beam L2 that is delivered from the light input means 20 is p-polarized light (or s-polarized light), and thus, may be reflected by the third polarizing beam splitter 8 after passing through the fourth polarizing beam splitter 9. The reflected light beam L2 may sequentially pass through the quarter wavelength plate 4, the light-condensing unit 10 and the quarter wavelength plate 4. Because the second light beam L2 passes through the quarter wavelength plate 4 twice, the second light beam L2 may become s-polarized light (or p-polarized light). Accordingly, the second light beam L2 is reflected by the second polarizing optical element 15 and then passes through the quarter wavelength plate 4 to be reflected by the light-condensing unit 10 again. The second light beam L2 that is reflected by the light-condensing unit 10 passes through the quarter wavelength plate 4. Because the second light beam L2 passes through the quarter wavelength plate 4 twice, the second light beam L2 may become p-polarized light (or s-polarized light). Accordingly, the second light beam L2 may pass through the second polarizing optical element 15 to be delivered to the eyes of the observer 12.

The first light beam L1 is delivered to the eyes of the observer 12 through the first polarizing optical element 14, and the second light beam L2 is delivered to the eyes of the observer 12 through the second polarizing optical element 15. Here, an image that the observer 12 may see may have the same shape as the image displayed on the micro display 3, differently from the image of the optical device for augmented reality according to the exemplary embodiment illustrated in FIG. 1. In this regard, an image for augmented reality may be same image as the image displayed on the micro display 3.

Figure 3A:
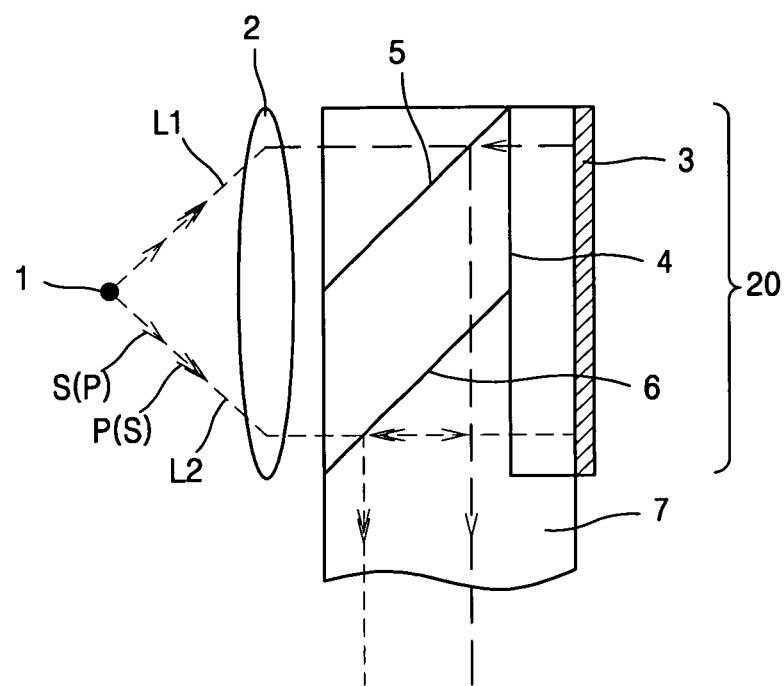
FIG. 3A is a sectional view of a light input means in FIG. 1.

FIG. 3A is a sectional view of the light input means 20 in FIG. 1. Referring to FIGS. 1 and 3A, the light source unit 1 and the condenser lens 2 may be placed in the light input means 20 in front of a surface of the light guide plate 7, the surface being opposite to the micro display 3.

Figure 3B:
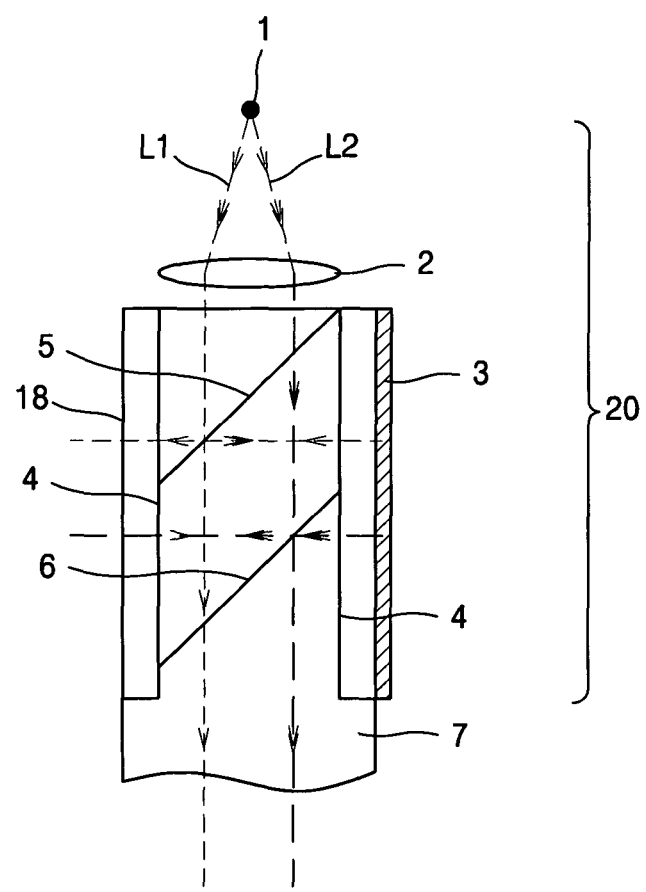
FIG. 3B is a sectional view of a light input means of an optical device for augmented reality according to another exemplary embodiment.

Compared to FIG. 3A, in the light input means 20 of the optical device for augmented reality according to another exemplary embodiment of FIG. 3B, the light source unit 1 and the condenser lens 2 may be placed in front of a surface of the light guide plate 7, the surface being vertical to the micro display 3. Referring to FIG. 3B, the light input means 20 may include the light source unit 1, the condenser lens 2, the micro display 3, two the quarter wavelength plates 4, the first and second polarizing beam splitters 5 and 6, the light guide plate 7, and a reflection plate 18.

The light source unit 1 and the condenser lens 2 may be placed in front of a surface that is vertical to the micro display 3, and the reflection plate 18 may be placed on a surface of the light guide plate 7, which is opposite to the micro display 3. The first and second polarizing beam splitters 5 and 6 may be arranged parallel to each other and/or between the reflection plate 18 and the micro display 3 in the light guide plate 7.

Light beam emitted from the light source unit 1 may be parallelized by the condenser lens 2. The first light beam L1 and the second light beam L2 parallelized by the condenser lens 2 may be reflected by the first and second polarizing beam splitters 5 and 6 toward the reflection plate 18, respectively, and pass through the quarter wavelength plate 4. Then the first light beam L1 and the second light beam L2 may be reflected by the reflection plate 18 and pass through the quarter wavelength plate 4 again. Because the polarized light passes through the quarter wavelength plate 4 twice, a polarization direction of the polarized light may be changed to be vertical to the original polarization direction thereof. Accordingly, because the first light beam L1 is p-polarized light (or s-polarized light) when incident onto the first polarizing beam splitter 5, and the second light beam L2 is s-polarized light (or p-polarized light) when incident onto the second polarizing beam splitter 6. Therefore, the first and second light beams L1 and L2 may pass through the first and second polarizing beam splitters 5 and 6, respectively. Then, the first and second light beams L1 and L2 may pass through the quarter wavelength plate 4 and reach the micro display 3. Based on the first and second light beams L1 and L2, an image for augmented reality may be displayed on the micro display 3. The micro display 3 may include a reflective light modulator, and in this case, light beam delivered to the micro display 3 may be reflected back in an incident direction. Also, the micro display 3 may include a light-emitting diode (LED) or an organic light-emitting diode (OLED), and in this case, the light source unit 1 and the condenser lens 2 may be omitted.

The first and second light beams L1 and L2 having information about the image may be incident onto the micro display 3 and then, be reflected to pass through the quarter wavelength plate 4 again. Because the polarized light passes through the quarter wavelength plate 4 twice in total, the direction of polarization may be changed to be vertical to the original direction thereof. Accordingly, the first light beam L1 may be s-polarized light (or p-polarized light) when incident onto the first polarizing beam splitter 5, while the second light beam L2 may be p-polarized light (or s-polarized light) when incident onto the second polarizing beam splitter 6. Therefore, the first and second light beams L1 and L2 may be reflected by the first and second polarizing beam splitters 5 and 6 respectively to be delivered to the light output means 30 through the light guide plate 7.

According to another exemplary embodiment illustrated in FIG. 3B, the light source unit 1 and the condenser lens 2 are placed in front of an end portion of the light guide plate 7 of the light input means 20, thereby reducing a thickness of an optical device for augmented reality.

Figure 4A:
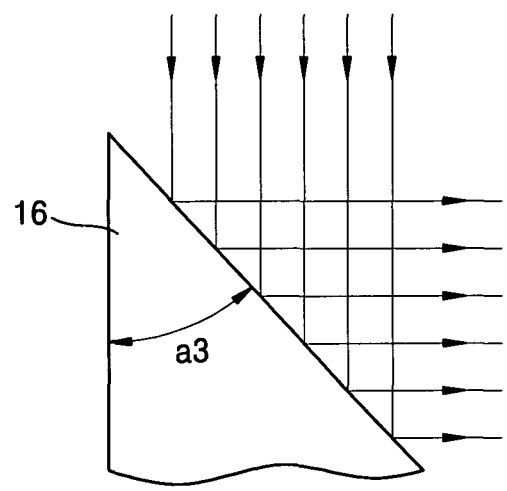
FIG. 4A is a cross-sectional view of a polarizing beam splitter of an optical device for augmented reality according to an exemplary embodiment.

FIG. 4A is a cross-sectional view of any one of the polarizing beam splitters 5, 6, 8, and 9 of an optical device for augmented reality according to an exemplary embodiment. As illustrated in FIG. 4A, each of the polarizing beam splitters 5, 6, 8, and 9 may be a reflection member or a reflection prism 16. The polarizing beam splitters 5, 6, 8, and 9 may be formed as the reflection member or the reflection prism that reflects incident light at a right angle. An angle of inclination a3 of the reflection member or the reflection prism 16 may be 45 degrees so that the incident light is reflected at a right angle.

Figure 4B:
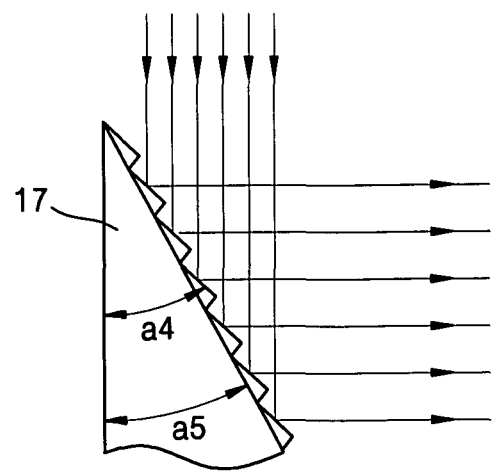
FIG. 4B is a cross-sectional view of a polarizing beam splitter of an optical device for augmented reality according to another exemplary embodiment.

FIG. 4B is a cross-sectional view of any one of the polarizing beam splitters 5, 6, 8, and 9 of an optical device for augmented reality according to another exemplary embodiment, wherein each of the polarizing beam splitters 5, 6, 8, and 9 is a Fresnel prism 17. The polarizing beam splitters 5, 6, 8, and 9 may be formed as the Fresnel prism 17 so that incident light is reflected at a right angle. Also, an angle of inclination a4 may be 45 degrees while an angle of inclination a5 may be less than 45 degrees. According to another exemplary embodiment illustrated in FIG. 4B, when each of the polarizing beam splitters 5, 6, 8, and 9 is the Fresnel prism 17, a thickness of an optical device for augmented reality may be reduced.

For example, polarization coatings may be provided to the reflection member, the reflection prism 16, or the Fresnel prism 17.

As described above, a head-mounted display device for augmented reality that has increased wearability due to a reduced size and weight and maintains the same viewing angle may be provided.

Although a few embodiments have been shown and described, it would be appreciated by those skilled in the art that changes may be made in the exemplary embodiments without departing from the principles and spirit of the disclosure, the scope of which is defined in the claims and their equivalents.

What is claimed is:
1. An optical device for augmented reality, the optical device comprising:
a light input part; and
a light output part, wherein the light input part comprises:
  a micro display;
  a first polarizing beam splitter and a second polarizing beam splitter configured to reflect or transmit incident light comprising an image displayed on the micro display; and
  a first quarter wavelength plate configured to receive light transmitted by the first polarizing beam splitter or the second polarizing beam splitter and change a polarized state of the received light, and
wherein the light output part comprises:
  a third polarizing beam splitter and a fourth polarizing beam splitter configured to transmit or reflect light comprising the image received from the light input part;
  a second quarter wavelength plate configured to receive the light transmitted by the third polarizing beam splitter or the fourth polarizing beam splitter and change the polarized state of the received light, and
  a light condenser configured to condense the polarized light.

2. The optical device of claim 1, wherein the light input part further comprises:
  a light source; and
  a condenser lens configured to parallelize the incident light.

3. The optical device of claim 1, wherein the first polarizing beam splitter and the second polarizing beam splitter are further configured to split the incident light into p-polarized light and s-polarized light,
  the micro display is configured to receive the p-polarized light or the s-polarized light that passes through the first quarter wavelength plate and reflect the received p-polarized light or the s-polarized light to the first quarter wavelength plate,
  the first quarter wavelength plate is further configured to transmit the p-polarized light or the s-polarized light that is reflected by the micro display, and
  the first polarizing beam splitter and the second polarizing beam splitter are further configured to reflect the p-polarized light or the s-polarized light transmitted from the first quarter wavelength plate to be transmitted to the light output part.

4. The optical device of claim 1, wherein the third polarizing beam splitter and the fourth polarizing beam splitter are further configured to reflect the light comprising the image received from the light input part,
  the second quarter wavelength plate is further configured to transmit the light reflected by the third polarizing beam splitter or the fourth polarizing beam splitter;
  the light condenser is further configured to reflect the light transmitted from the second quarter wavelength plate; and
  the second quarter wavelength plate is further configured to transmit the light reflected by the light condenser to be transmitted to an outside.

5. The optical device of claim 1, further comprising:
  a light guide plate comprising an optically transparent material and configured to provide a path of the light, the light guide plate being provided a form of a parallel plate.

6. The optical device of claim 1, further comprising:
  a light guide plate comprising an optically transparent material and configured to provide a path of the light, the light guide plate being provided in a form of a curved plate.

7. The optical device of claim 1, wherein at least one of the first polarizing beam splitter and the second polarizing beam splitter comprises at least one of a reflection member, a prism, and a Fresnel prism, having a polarization coating thereon.

8. The optical device of claim 1, wherein the image comprises at least one of a two dimensional (2D) image and a holographic image.

9. The optical device of claim 1, wherein the micro display comprises at least one of a reflective light modulator, a light-emitting diode (LED), and an organic light-emitting diode (OLED).

10. The optical device of claim 1, wherein the light condenser is positioned on a surface of the light output part, the surface being closest to the micro display among surfaces of the light output part.

11. The optical device of claim 1, wherein the light condenser is positioned on a surface of the light output part, the surface being farthest away from the micro display among surfaces of the light output part.

12. The optical device of claim 2, wherein the light source and the condenser lens are positioned adjacent to a surface of the light input part, the surface being farthest away from the micro display among surfaces of the light output part.

13. The optical device of claim 2, wherein the light source and the condenser lens are positioned adjacent to a surface of the light input part, the surface being vertical to the micro display.

14. The optical device of claim 1, wherein the light output part further comprises a compensation element configured to receive and magnify externally provided light, the externally provided light including information about an external object.

* * * * *